United States Patent [19] [11] 4,002,520
Fenton [45] Jan. 11, 1977

[54] MANUFACTURE OF VEHICLE SEATS

[75] Inventor: Sidney Desmond Fenton, Forton, near Preston, England

[73] Assignee: Storey Brothers and Company Limited, White Cross, England

[22] Filed: Feb. 5, 1973

[21] Appl. No.: 329,953

[30] Foreign Application Priority Data

Feb. 11, 1972 United Kingdom ............ 6544/72

[52] U.S. Cl. .............................. 156/246; 156/272; 156/285; 264/45.1; 264/46.4; 264/46.8

[51] Int. Cl.² ................. B29C 9/00; B29C 27/06; B29D 7/02; B29D 27/04

[58] Field of Search ......... 156/245, 246, 248, 250, 156/251, 252, 253, 272, 285, 303.1, 382, 267, 268; 264/88, 90, 139, 239, 241, 257, 258, 45, 92; 297/DIG. 1, DIG. 2

[56] References Cited

UNITED STATES PATENTS

| 2,802,766 | 8/1957 | Leverenz | 264/45 |
|---|---|---|---|
| 2,955,972 | 10/1960 | Wintermute et al. | 264/45 |
| 3,123,863 | 3/1964 | Reilly et al. | 264/92 |
| 3,258,511 | 6/1966 | McGregor | 264/45 |
| 3,390,214 | 6/1968 | Woods | 264/45 |
| 3,407,104 | 10/1968 | Crandall | 156/285 |
| 3,446,685 | 5/1969 | Goldstone | 156/285 |
| 3,446,686 | 5/1969 | Butler et al. | 156/285 |

FOREIGN PATENTS OR APPLICATIONS

| 1,023,880 | 3/1966 | United Kingdom | |
| 873,518 | 7/1961 | United Kingdom | 264/45 |
| 1,232,381 | 5/1971 | United Kingdom | |
| 960,144 | 6/1964 | United Kingdom | 156/285 |

Primary Examiner—Caleb Weston
Attorney, Agent, or Firm—Pollock, Vande Sande & Priddy

[57] ABSTRACT

This invention relates to the preparation of covers for padded items such as vehicle seats and to the padded items themselves. The covers are formed to shape by vacuum forming a thermoplastics sheet and then at least one fabric panel is welded around its edges to the underside of the shaped cover and the thermoplastics material is removed from over the fabric panel to expose the fabric. A padded item is thereafter preferably made from the resulting fabric panelled cover by forming a foamable mixture within the cover.

10 Claims, 4 Drawing Figures

MANUFACTURE OF VEHICLE SEATS

This invention relates to the manufacture of vehicle seats and other upholstered items. More particularly the invention relates to the manufacture of padded cushions for the seat cushions or back-rests of car seats, armchairs, settees, or the like.

BACKGROUND TO THE INVENTION

Shaped loose covers for such cushions can be prepared by shaping thermoplastics sheeting over a suitable mould and then the padded item can be made from the loose cover by placing it over a resilient filling or preferably the padded item or at least a part of it is made by foaming a foamable mixture in situ within the cover.

BRIEF DESCRIPTION OF THE INVENTION

We have now found that an attractive loose cover can be prepared by welding to a shaped thermoplastics sheeting cover at least one fabric panel to the intended inner surface of the shaped cover, and removing the thermoplastics sheeting from the region over the fabric panel so as to expose the fabric.

The fabric panel can be a visual contrast to the remainder of the cover and so one can produce covers of distinctive appearance. In addition the fabric panel will have a different surface texture from the remainder of the cover. Usually the fabric panel will be positioned in the well of a vehicle or other seat cushion or in the corresponding depression in the back-rest of a vehicle or other seat. These are the regions of the padded cushion against which the body of a person rests when using the cushion and so the pleasant texture of the fabric can improve the comfort of the user of the padded cushion.

The loose cover according to the invention is then given a suitable resilient filling, e.g. a foamed rubber or plastics material and/or springing. Preferably, however, the filling is a plastics material foam, e.g. a polyurethane foam, which has been foamed in situ in the cover. This has a number of important advantages including the fact that the loose cover and foam become intimately bonded to one another and so the cover does not slip over the filling and become creased with age when the padding is compressed by a person sitting on the cushion or when the cover stretches or the padding becomes permanently compressed with age. Additionally the bonding of the cover and foam gives a padded cushion which has better wear resistance than padded cushions where the cover is not so bonded.

The foam filling is preferably a polyurethane foam, and the cells of the foam are preferably of small size with thin walls and with a foam density of about 56 Kg/m$^3$. Desirably the foam is open-celled, or at least a large number of the cells are open-celled since this tends to give a softer foam.

The thermoplastics sheeting has preferably been shaped by vacuum forming to give a shaped cover to which the fabric is to be welded. By the term "vacuum formed", as used herein we include both the shaping of a softened laminate over or into a mould by sucking it over or into the mould and the equivalent process in which a pressurised gas is used to force the softened laminate over or into a mould.

This shaped cover is desirably a cast thermoplastics sheet material shaped by vacuum forming, for example a shaped cover as described and claimed in our United Kingdom Pat. No. 1,232,381. A full description of the manufacture of such a cover is given in that Patent.

The material of the loose cover is preferably a highly plasticized vinyl chloride polymer to ensure that the cover has a soft feel. The sheeting desirably has a lacquer covering layer to prevent loss of plasticizer.

Also, the cover is preferably a laminate material with a solid skin coating and a foamed back coating so that the "break" of natural leather is to some extent simulated. The surface of the thermoplastics sheet material has preferably been given a deep embossment to improve its simulation of real leather and to improve the comfort of the cushion by enabling fairly free passage of air between the cover and body of the person on the seat.

The fabric panel can be joined to the shaped thermoplastics material by means of a suitable weld. Preferably the weld is made by induction welding using a welding electrode in contact with the thermoplastics materials which will give a tear seal so that, after welding, the thermoplastics material over the fabric can be torn out to leave a neat joint between the fabric and thermoplastics material. The electrode can also be shaped so as to leave a simulated bead and/or stitching around the joint.

The fabric of the panel can be any type of fabric, e.g. made from natural or synthetic fibres or mixtures. Also the fabric can be a woven, non-woven or knitted fabric. Preferably the fabric has a raised pile so as to give a velvet-like feel and an example of a preferred fabric is a warp knitted loop raised pile fabric, e.g. of nylon, such a raised fabric having the advantage that it will mask any small creases in the fabric. Where a laminate is used an example of a suitable laminate is such a warp knitted loop raised pile fabric having bonded to its rear face, i.e. not to the loops, a skin coating of a polyurethane or a plasticized polyvinyl chloride. Such a laminate has a considerable degree of stretch as the fabric panels can be caused to take a shape requiring bending in two directions.

The fabric can be used as it is but where the padding is formed by foaming in situ within the cover the fabric must have a sufficiently closed structure to avoid passage of foam through the fabric. Preferably, however, the fabric is one layer of a laminate of fabric and a sheet of plastics material, e.g. a material of the type which we sell under the Trade Mark "Stylon", since the use of such a laminate avoids the penetration of foamable mixture through the fabric when a foam is formed in situ within the cover.

When the loose cover with the fabric panel is filled with a foam which is foamed in situ the cover is preferably held in a female mould of the shape of the finally desired padded item while the foamable mixture is foaming and filling the cover, and the shaped loose cover is held to a shape of the female mould by applying a vacuum, i.e. reduced pressure, between the mould and cover.

Naturally the vacuum between the cover and female mould must be retained if the cover is to be held against the female mould and so one cannot normally use a simple piece of fabric for the fabric panel if the cover is to be filled in this way. Therefore the fabric should be air-tight, e.g. a laminate of a fabric with a piece of plastics material such as a plasticized vinyl chloride polymer material, or the fabric must be sealed by means of a suitable sealing coating. In the alternative, however, it may be possible to hold the cover in place against the female mould by the vacuum solely in the region of the shaped thermoplastics material leaving the region of the fabric panel free.

It is preferred, however, that the fabric panels be a laminate of a fabric and a sheet of plastics material and that the whole shaped cover, including the fabric panel, be held against the female mould since this is found to have an important advantage. Thus the fabric panel in the loose cover need not be shaped and can be substantially flat but, by providing the female mould with a suitable fluting, quilting or other shaped surface, the fabric panel can be caused to take up this shape by the vacuum applied and then after the filling has been foamed, it is surprisingly found that the fabric panel will retain this shape. When the fabric is to be shaped in this way, the choice of fabric is important since if it has to bend in more than one direction it must have some extensibility. Where fluting or the like is to be formed in the fabric panel, this does not usually require much stretching of the fabric to conform to the shape desired and so the material need not be particularly extensible. If however more complicated patterns are required then the fabric of the panels should be chosen so as to be sufficiently extensible and should also be sealed to enable them to be sucked down to conform to the mould shape.

Additionally the fabric panel can be pre-shaped by vacuum forming it if the panel needs to be stretched considerably to conform to the required shape. In this case the fabric panel can be a laminate of, for example a fabric made from a highly crumped or coiled yarn or a knitted fabric and a sheet of thermoplastics material.

BRIEF DESCRIPTION OF THE DRAWINGS

The invention will now be illustrated, by way of example, with reference to the accompanying drawings, in which.

DESCRIPTION OF THE PREFERRED EMBODIMENT

Figure 1:
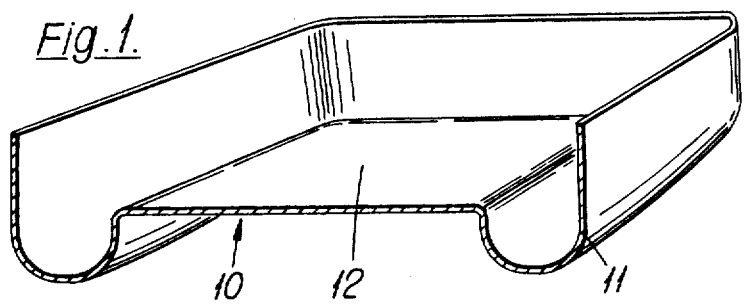
FIG. 1 is a sectional view through a shaped loose cover prepared as according to our Patent No. 1,232,381.
Figure 2:
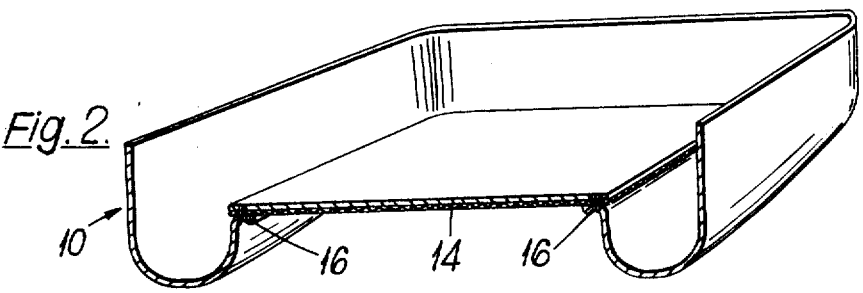
FIG. 2 is a similar view through a shaped loose cover according to the invention.

The shaped loose cover 10 shown in FIG. 1 has been prepared as described in our U.S. Pat. No. 1,232,381. It consists of a plasticized polyvinyl chloride sheeting 11 comprising a skin coating layer and a foamed backing layer not shown in detail which has been shaped to the general shape of the cover by vacuum forming.

The thermoplastic sheeting can be formed by casting a skin coating of a plasticized vinyl chloride polymer followed by a foamable vinyl chloride polymer coating on an embossed temporary support. The coating is fused and blown to give the thermoplastic sheeting, which sheeting in turn is removed from the temporary support.

Against the central panel 12, which will form the well of the finished padded cushion, a piece of the fabric material 14 which we sell under the Trade Mark "Stylon" is laid. This material consists of a laminate of a calendered sheet of plasticized polyvinyl chloride 0.006 inch thick, and a brushed loop raised knitted nylon fabric of 30 denier yarn having 61 courses and 42 wales per inch and weighing 2.4oz/per square yard. The piece of fabric material 14 is laid with the fabric side against the cover 10.

The cover 10 and piece of fabric material 14 are welded together around the edges of the central panel by means of a weld line 16. The welding is effected by high frequency welding using a tear seal welding electrode of the shape of the panel 12 so as to give a weld along the line 16. The electrode is also shaped so as to fuse the sheeting 11 around the region of the weld line 16 and shape it to simulate a bead 17 and/or stitching not shown. Thereafter, the material of the cover 10 is removed in the region of the panel so as to expose the fabric side of the material 14 and leave a neat welded joint between the edge of the material of the cover 10 and the material 14 and the bead 17.

Figure 3:
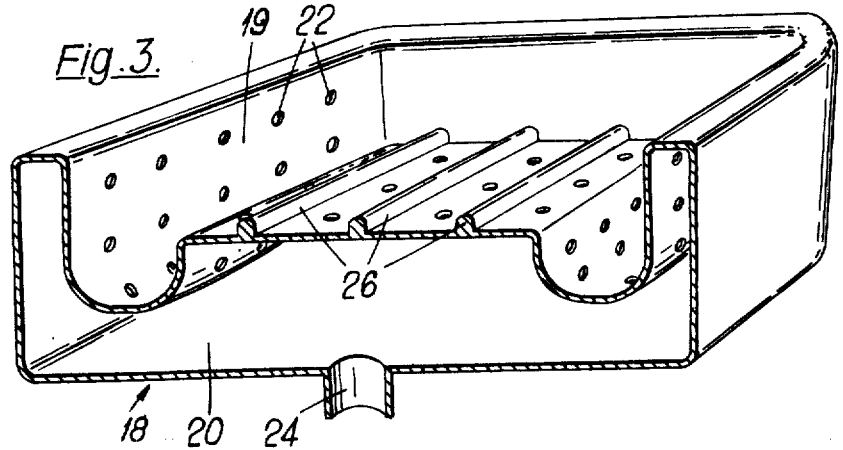
FIG. 3 is a sectional view through a mould for use.

This composite cover is next placed within the female mould 18 shown in FIG. 3. This mould consists of an inner mould surface 19 and an outer vacuum box 20. The surface 19 has a shape corresponding to that of the finished padded cushion. Through the surface 19 are a number of fine holes 22. Air is removed from the region between the surface 19 and box 20 by means of a vacuum line 24.

The surface 19 has ribs 26 in the region of the fabric panel of the cover to impart a shape to the initially flat panel. The vacuum applied through the holes 22 to between the cover and surface 19, sucks the cover down against the surface causing it to conform to the shape of the surface 19.

Then a metered amount of a foamable mixture which will foam to give a foamed polyurethane 28 is poured into the cover, a rear member is placed over the cover in the mould to define an enclosed region and the foamable mixture left to foam and fill this interior region to give the finished padded cushion 30.

Figure 4:
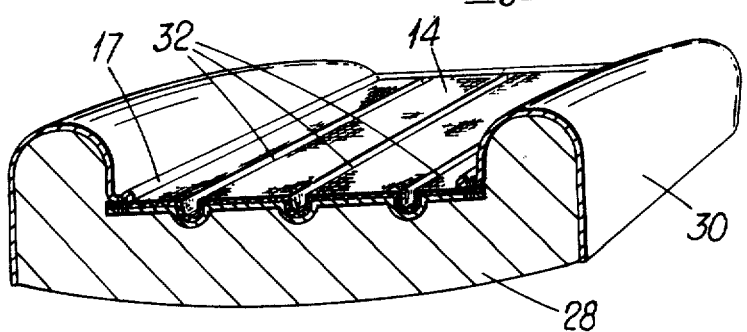
FIG. 4 is a sectional view through a padded cushion formed from a loose cover as shown in FIG. 2 after positioning in the mould shown in FIG. 3 and filling with a foam.

This is then removed from the mould 16 and has the shape shown in FIG. 4. It will be noted that, although the fabric panel was made of initially flat material 14, the foamed polyurethane holds the fabric panel to the shape imparted by sucking the panel against the mould surface 19 and the ribs 26 have corresponding depressions 32 in the finished cushion.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. The method of making a loose cover for a padded item comprising:
   A. forming a thermoplastic sheet comprising a sealing surface layer and a foam backing layer by casting a skin coating of a plasticized vinyl chloride polymer followed by a foamable vinyl chloride polymer coating on an embossed temporary support, fusing and blowing said coating to give said thermoplastic sheeting, and removing said thermoplastic sheeting from said temporary support;
   B. shaping said thermoplastic sheet by vacuum forming to give a shaped thermoplastic cover which generally corresponds to the shape of the desired padded item;

C. welding the edges of at least one fabric panel to said shaped thermoplastic cover, said panel being secured by said welding to the underside of said shaped thermoplastic cover; and D. removing thermoplastic sheet material from the region within that defined by the edges of the welded fabric and being over said fabric panel to expose said fabric panel from the outside of said shaped thermoplastic cover, and thereby obtaining said loose cover.

2. A method according to claim 1 in which said fabric has been made impervious by means of a sealing coating.

3. The method of claim 1 wherein said padded item is a padded cushion for seat cushions or backrests.

4. A method according to claim 1 in which said welding step is effected by electric induction welding using a tear seal electrode thereby enabling the thermoplastic sheeting to be readily removed from over the fabric panel or panels.

5. A method according to claim 4 in which said electrode is shaped so as to form a bead or stitching in said thermoplastics sheet around the weld region during welding.

6. A method according to claim 7 in which said fabric panel is a laminate of a fabric and a sheet of plastics material.

7. A method according to claim 6 in which said fabric panel is a laminate of a knitted fabric and sheet of a plasticized vinyl chloride polymer.

8. A method of claim 6 which comprises the step of shaping said fabric panel by vacuum forming before applying and before welding said fabric panel to said shaped cover.

9. A method of making at least part of a padded item comprising forming a resilient foam in situ within a cover according to claim 6 to give said padded item.

10. A method according to claim 9 in which said cover is held by vacuum in a female mould of the required shape of the padded item while the foam is formed within the cover, the resulting foam holding the cover in its required shape after removal from the mould.

* * * * *